(12) United States Patent
Muthusamy

(10) Patent No.: US 9,720,687 B2
(45) Date of Patent: Aug. 1, 2017

(54) VALIDATING AND MAINTAINING RESPECTIVE VALIDATION STATUS OF SOFTWARE APPLICATIONS AND MANUFACTURING SYSTEMS AND PROCESSES

(71) Applicant: ValGenesis, Inc., Fremont, CA (US)

(72) Inventor: Sivakumar Muthusamy, Fremont, CA (US)

(73) Assignee: VALGENESIS, INC., Fremont, CA (US)

( * ) Notice: Subject to any disclaimer, the term of this patent is extended or adjusted under 35 U.S.C. 154(b) by 0 days.

(21) Appl. No.: 14/836,942

(22) Filed: Aug. 26, 2015

(65) Prior Publication Data

US 2016/0062740 A1  Mar. 3, 2016

Related U.S. Application Data

(60) Provisional application No. 62/042,499, filed on Aug. 27, 2014.

(51) Int. Cl.
| | |
|---|---|
| *G06F 9/44* | (2006.01) |
| *G06F 9/445* | (2006.01) |
| *G06F 11/36* | (2006.01) |
| *G06Q 10/00* | (2012.01) |

(52) U.S. Cl.
CPC ............ *G06F 8/71* (2013.01); *G06F 9/44589* (2013.01); *G06F 11/3688* (2013.01); *G06Q 10/00* (2013.01)

(58) Field of Classification Search
CPC ..... G06F 8/71; G06F 11/3688; G06F 9/44589
USPC ................................. 717/121, 124, 120, 126
See application file for complete search history.

(56) References Cited

U.S. PATENT DOCUMENTS

| | | | | |
|---|---|---|---|---|
| 6,161,113 A * | 12/2000 | Mora | ..................... | G06Q 10/10 715/234 |
| 6,336,217 B1 * | 1/2002 | D'Anjou | ................... | G06F 8/71 707/999.202 |
| 8,205,191 B1 * | 6/2012 | Kolawa | ................. | G06F 11/368 717/124 |
| 8,627,272 B1 * | 1/2014 | Lin | .......................... | G06F 8/10 717/104 |

(Continued)

*Primary Examiner* — Phillip H Nguyen
(74) *Attorney, Agent, or Firm* — Amin, Turocy & Watson, LLP

(57) ABSTRACT

Validating and maintaining respective validated status of software applications and manufacturing systems and processes is presented herein. A validation system can comprise a mapping component configured to extract, from a set of requirement specification documents, individual requirement specifications; and extract, from a set of test function documents, test steps. Further, the validation system can comprise a tracing component configured to generate a trace matrix associating the individual requirement specifications with respective test steps of the test functions or respective documents of the set of requirement specification documents. In an aspect, the validation system can enforce, via respective object linking and embedding control extensions, respective roles of authors, reviewers, and approvers of the set of requirement specification documents. In another aspect, the validation system can electronically receive and insert test results in the set of test function documents. Further, the validation system can perform automated validation of software in execution.

20 Claims, 16 Drawing Sheets

(56) References Cited

U.S. PATENT DOCUMENTS

| | | | | |
|---|---|---|---|---|
| 8,732,105 B1* | 5/2014 | Presgraves | ............. | G05B 17/02 |
| | | | | 706/46 |
| 8,954,369 B1* | 2/2015 | Presgraves | ......... | G05B 23/0283 |
| | | | | 700/79 |
| 9,032,259 B1* | 5/2015 | Hood | ....................... | G06F 11/34 |
| | | | | 714/57 |
| 9,442,830 B1* | 9/2016 | Zhang | ................. | G06F 11/3688 |
| 2003/0179403 A1* | 9/2003 | Kofman | ................ | G06F 3/1297 |
| | | | | 358/1.15 |
| 2005/0166094 A1* | 7/2005 | Blackwell | ........... | G06F 11/3664 |
| | | | | 714/38.14 |
| 2006/0059027 A1* | 3/2006 | Berenbach | ............. | G06F 17/50 |
| | | | | 717/104 |
| 2013/0185056 A1* | 7/2013 | Ingram | ............... | G06F 11/3684 |
| | | | | 704/9 |

* cited by examiner

VALIDATING AND MAINTAINING RESPECTIVE VALIDATION STATUS OF SOFTWARE APPLICATIONS AND MANUFACTURING SYSTEMS AND PROCESSES

PRIORITY CLAIM

This application claims priority to U.S. Provisional Patent Application Ser. No. 62/042,499, filed on Aug. 27, 2014, entitled "EFFICIENT MAINTENANCE OF VALIDATED STATUS OF SOFTWARE APPLICATIONS", the entirety of which is incorporated by reference herein.

TECHNICAL FIELD

The subject disclosure generally relates to embodiments for validating and maintaining respective validated status of software applications and manufacturing systems and processes.

BACKGROUND

Enterprise software applications and manufacturing systems and processes used in regulated life science companies require validation before use in production systems, and such validation is expensive and time consuming. Further, after validation process, these validated enterprise software applications and manufacturing systems are subject to change control, in which a validation status of such applications must be maintained throughout their lifecycle to meet compliance requirements. However, conventional validation technologies have had some drawbacks with respect to maintaining the validation status of related document deliverables, and requiring manual processing of change requests corresponding to validation deliverables including, a user requirements specification (URS), a functional requirements specification (FRS) and functional test cases.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
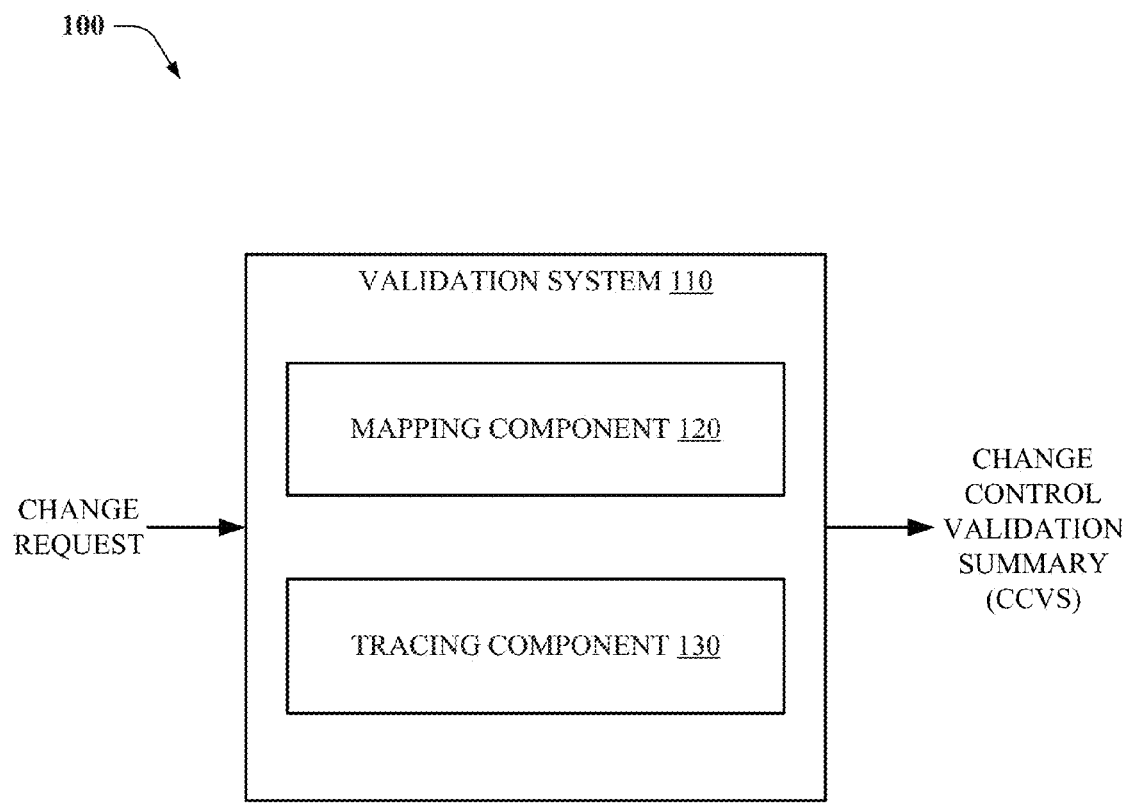
FIG. 1 illustrates a block diagram of a validation system for performing automated maintenance of a validated status of a software application, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Enterprise software applications and systems used in regulated life science companies are required to be validated before production use—such validation being expensive and time consuming. Further, after validation, enterprise software applications and systems are subject to change control, in which the validation status of such applications and systems must be maintained over their lifetime to meet compliance requirements.

Changes are inevitable and required to improve production processes, and minor changes can have a cascade effect on related document deliverables, significantly impacting the effort to maintain the validation status of such applications and systems. For example, a URS can be related to an FRS, which can be related to design specifications and test steps, test cases, etc. In this regard, any change to a URS requirement will impact one or more FRS requirements, design specifications, and test steps, test cases, etc. Consequently, to maintain the validation status of enterprise software applications and systems, all impacted deliverables must be updated, reviewed, and approved.

As mentioned, conventional validation technologies have had some drawbacks with respect to maintaining the validation status of related document deliverables. Further, such technologies have had some drawbacks with respect to requiring manual processing of change requests corresponding to validation deliverables. On the other hand, various embodiments disclosed herein can improve validation efficiency by dynamically creating relationships between requirements specifications, e.g., URS, FRS, etc. and functional test steps, cases, etc. In this regard, such embodiments can dynamically link individual requirements and test steps available in different validation deliverables, documents, etc.

For example, a validation system can comprise a processor, and a memory that stores executable instructions that, when executed by the processor, facilitate performance of operations, comprising: extracting, from a set of requirement specification documents, e.g., a Microsoft® Word file, a Microsoft® Excel file, etc. individual requirement specifications, e.g., a URS, an FRS, etc.

In an embodiment, the operations can comprise extracting the individual requirement specifications as objects, data objects, etc. from respective data elements of the set of requirement specification documents. In one embodiment, a data element of the respective data elements can comprise a row of a table of the Microsoft® Word file or a cell of the Microsoft Excel file.

Further, the operations can comprise extracting individual test steps from a set of test function documents, e.g., a Microsoft® Word file, a Microsoft® Excel file, etc. In one embodiment, the operations can comprise extracting the individual test steps as objects, data objects, etc. from respective data elements of the set of test function documents. In another embodiment, a data element of the respective data elements can comprise a row of a table of the Microsoft® Word file or a cell of the Microsoft Excel file.

Furthermore, in response to a first time validation, the operations can comprise generating, creating, etc. a trace matrix that associates the individual requirement specifications with respective test steps of the individual test steps or respective documents of the set of requirement specification documents. In an embodiment, the generating the trace matrix comprises associating a requirement identification (ID), e.g., 1.1, of the individual requirement specifications with a test step ID of the respective test steps, e.g., 1.1.1— the test step ID comprising the requirement ID.

In an embodiment, for validation status maintenance, the operations can further comprise receiving a URS change request for a URS of the individual requirement specifications, and determining, based on the trace matrix, a set of impacted functional requirement specifications of the individual requirement specifications corresponding to, affected by, impacted by, etc. the URS change request.

In another embodiment, regarding a validation status, the operations can further comprise determining, based on the trace matrix, a set of impacted test steps of the respective test steps corresponding to, affected by, impacted by, etc. the URS change request.

In yet another embodiment, the operations can further comprise maintaining a validation status by generating, creating, etc. a summary document, or change control document, e.g., a CCVS, identifying the URS change request, the set of impacted functional requirement specifications, and the set of impacted test steps.

In an embodiment, the operations can further comprise modifying, based on a defined validation role, e.g., author role, reviewer role, approver role, etc. via an object linking and embedding (OLE) control extension (OCX), a file access permission of a requirement specification document of the set of requirement specification documents, a test function document of the set of test function documents, and/or a set of test steps of the set of test function documents.

In another embodiment, the modifying the file access permission comprises controlling a dynamic link library (DLL) of an application, e.g., a Microsoft® Word file, a Microsoft® Excel file, etc. corresponding to the requirement specification document, the test function document, or the set of test steps, e.g., the DLL installed on a local machine, system, etc. of a user associated with the defined validation role.

In yet another embodiment, the file access permission corresponds to a track change function, e.g., track changes, etc. of the requirement specification document or the test function document.

In an embodiment, the operations further comprise enforcing, via respective OLE control extensions, or OCX controls, respective roles of authors, reviewers, and approvers of the set of requirement specification documents.

In one embodiment, a method can comprise obtaining, by a system comprising a processor, requirement specifications, e.g., a URS, an FRS, etc. from a first set of documents, e.g., a Microsoft® Word file, a Microsoft® Excel file, etc. Further, the method can comprise obtaining, by the system, test functions from a second set of documents, e.g., a Microsoft® Word file, a Microsoft® Excel file, etc., and associating, by the system via a trace matrix, the requirement specifications with respective test steps of the test functions.

In another embodiment, the associating can comprise associating a requirement ID of the requirement specifications with a test step ID of a test step of the test functions— the test step comprising the requirement ID.

In yet another embodiment, the obtaining the requirement specifications comprises obtaining the requirement specifications as first objects from first respective data elements of the first set of documents—the obtaining the test functions comprising obtaining the test functions as second objects from second respective data elements of the second set of documents, and the first respective data elements and the second respective data elements comprising at least one of a row of a table of a Microsoft® Word file or a cell of a Microsoft® Excel file.

One embodiment can comprise a machine-readable storage medium, comprising executable instructions that, when executed by a processor, facilitate performance of operations, comprising: reading requirement specifications, e.g., a URS, an FRS, etc. and test steps from documents, e.g., a Microsoft® Word file, a Microsoft® Excel file, etc., and creating a trace matrix that identifies relationships between the requirement specifications and the test steps.

In another embodiment, the reading the requirement specifications and test functions comprises: extracting the requirement specifications and test functions as objects from respective data elements, e.g., rows, cells, etc. from the documents, e.g., a Microsoft® Word file, a Microsoft® Excel file.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "function", "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various embodiments, processor(s) for implementing embodiments disclosed herein can comprise distributed processing devices, or parallel processing devices, in a single machine, device, etc., or across multiple machines, devices, etc. Furthermore, the processor(s) can comprise a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a network device, a gateway, a wireless communication device, etc., by receiving reports from such communication equipment, by receiving operator preferences, by receiving historical information, by receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by validation system 110 (see below), comprising, but not limited to, extracting, from a set of requirement specification documents, individual requirement specifications; extracting, from a set of test function documents, test steps; and generating a trace matrix that associates the individual requirement specifications with respective test steps of the test functions or respective documents of the set of requirement specification documents.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data.

Other directed and undirected model classification approaches comprise, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

For example, the classifier(s) can be used by the artificial intelligence system, e.g., validation system 110 (see below), to automatically determine, based on a trace matrix, a set of functional requirement specifications corresponding to a received URS change request, and a set of test functions corresponding to the URS change request. Further, the artificial intelligence system can automatically generate a summary document, e.g., change control summary document, identifying the URS change request, the set of functional requirement specifications, and the set of test functions.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Figure 2:
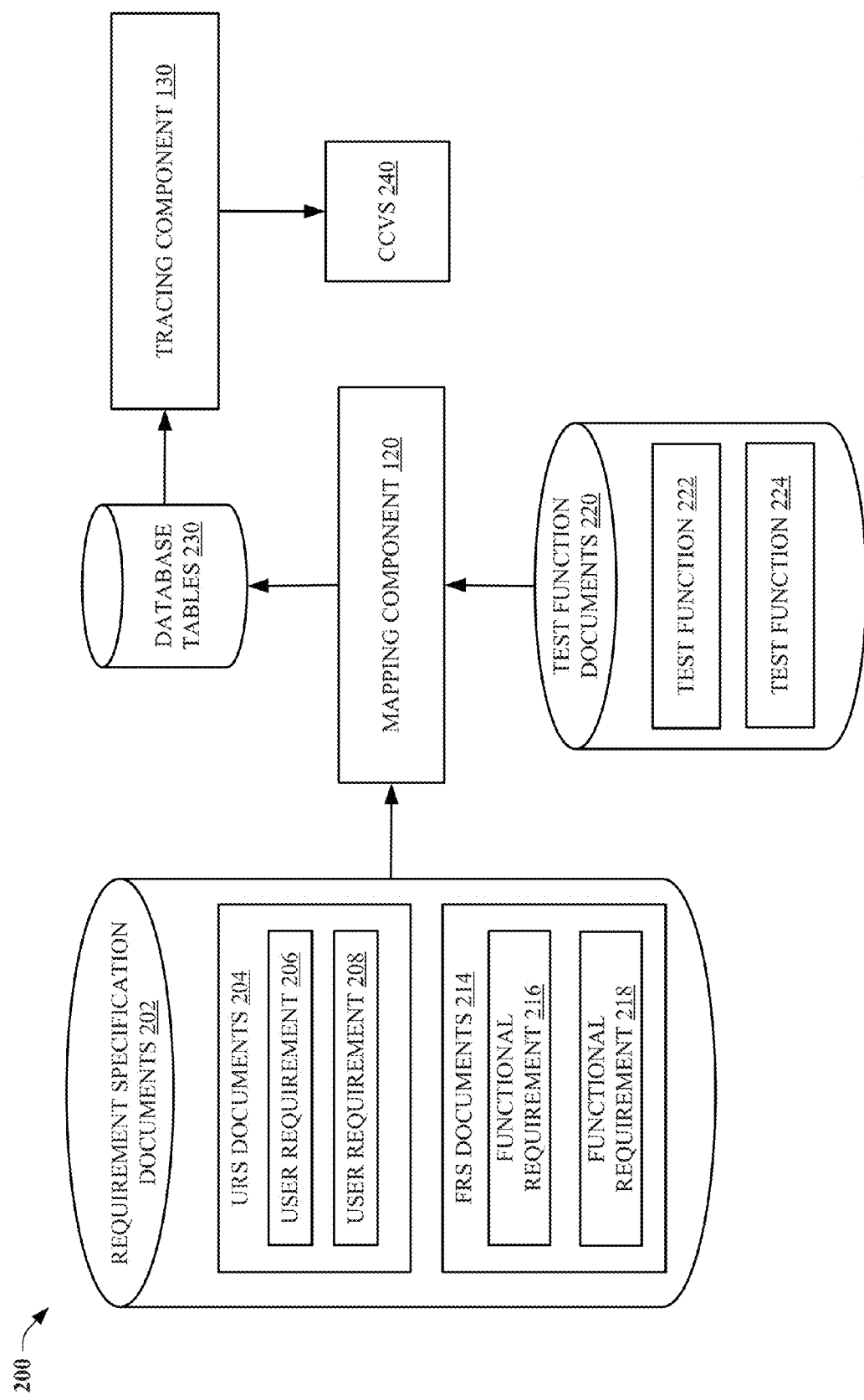
FIG. 2 illustrates another block diagram of a system for validating and maintaining respective validated status of software applications and manufacturing systems and processes, in accordance with various embodiments.

Now referring to FIGS. 1 and 2, block diagrams of validation systems (110, 200) for performing automated maintenance of a validated status of a software application are illustrated, in accordance with various embodiments. Validation system 110 can include mapping component 120 and tracing component 130. As illustrated by FIG. 2, mapping component 120 can be configured to extract, from requirement specification documents 202, e.g., URS documents 204, FRS documents 214, etc. individual requirement specifications, e.g., user requirement 206, user requirement 208, functional requirement 216, functional requirement 218.

In an embodiment, mapping component 120 can extract the requirement specifications as objects, data objects, etc. from respective data elements (not shown), e.g., a row of a table of a Microsoft® Word file, a cell of a Microsoft Excel file, etc. of requirement specification documents 202, and store the objects in a data store, e.g., database tables 230.

Mapping component 120 can further be configured to extract, from test function documents 220, test steps, e.g., test function 222, test function 224, etc. In one embodiment, mapping component 120 can extract the test steps as objects, data objects, etc. from respective data elements (not shown), e.g., a row of a table of a Microsoft® Word file, a cell of a Microsoft Excel file, etc. of test function documents 220, and store the objects in the data store, e.g., database tables 230.

Figure 3:
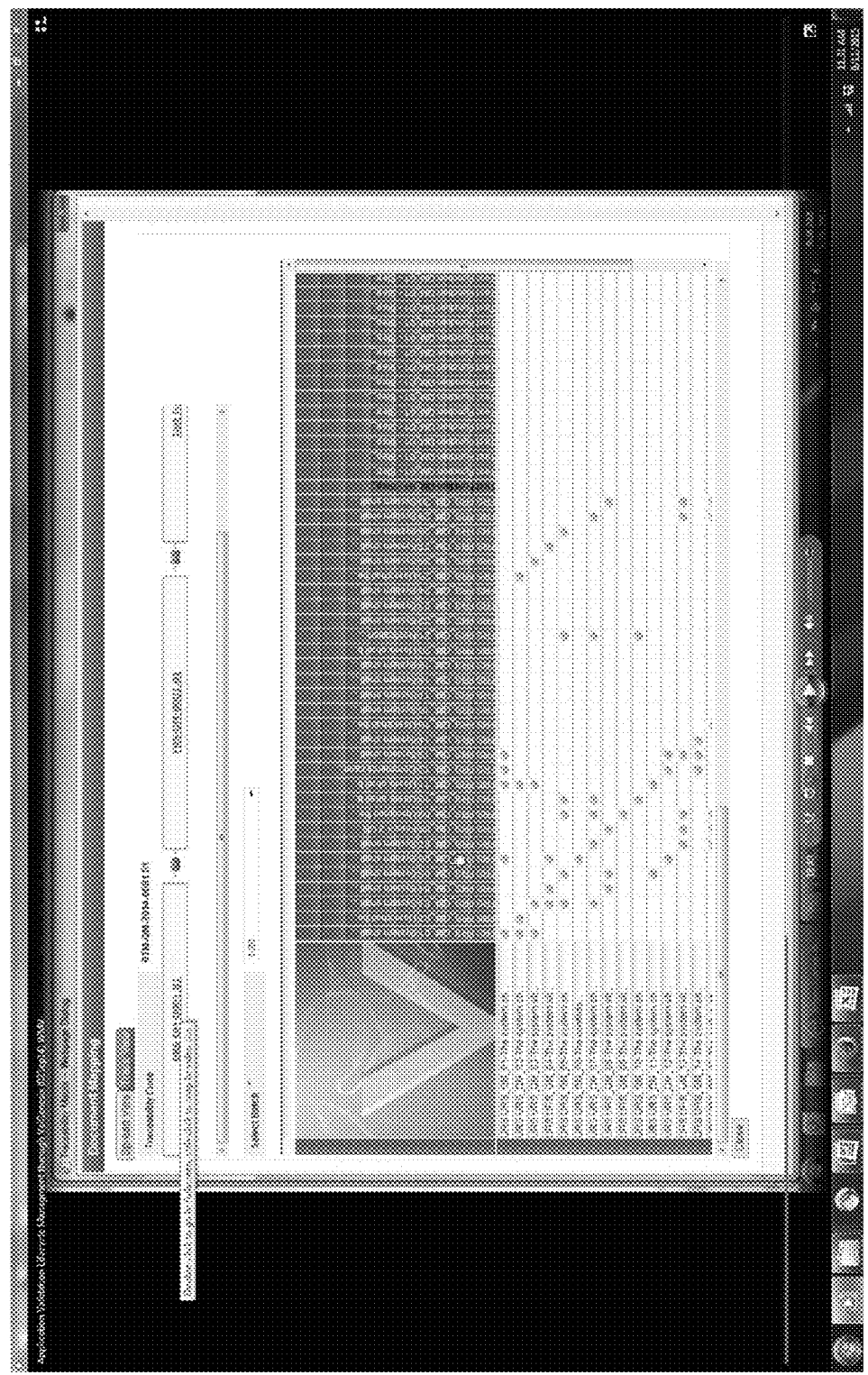
FIG. 3 illustrates a screen shot of a trace matrix generated by a tracing component, in accordance with various embodiments.

In this regard, tracing component 130 can be configured to generate, based on the objects stored in the data store, a trace matrix, e.g., illustrated by screen shot 300 of FIG. 3, which associates the individual requirement specifications with respective test steps of the test functions. In an embodiment, tracing component 130 can generate the trace matrix by associating a requirement identification (ID), e.g., 1.1, of the individual requirement specifications with a test step ID of the respective test steps, e.g., 1.1.1—the test step comprising the requirement ID 1.1.

Figure 4:
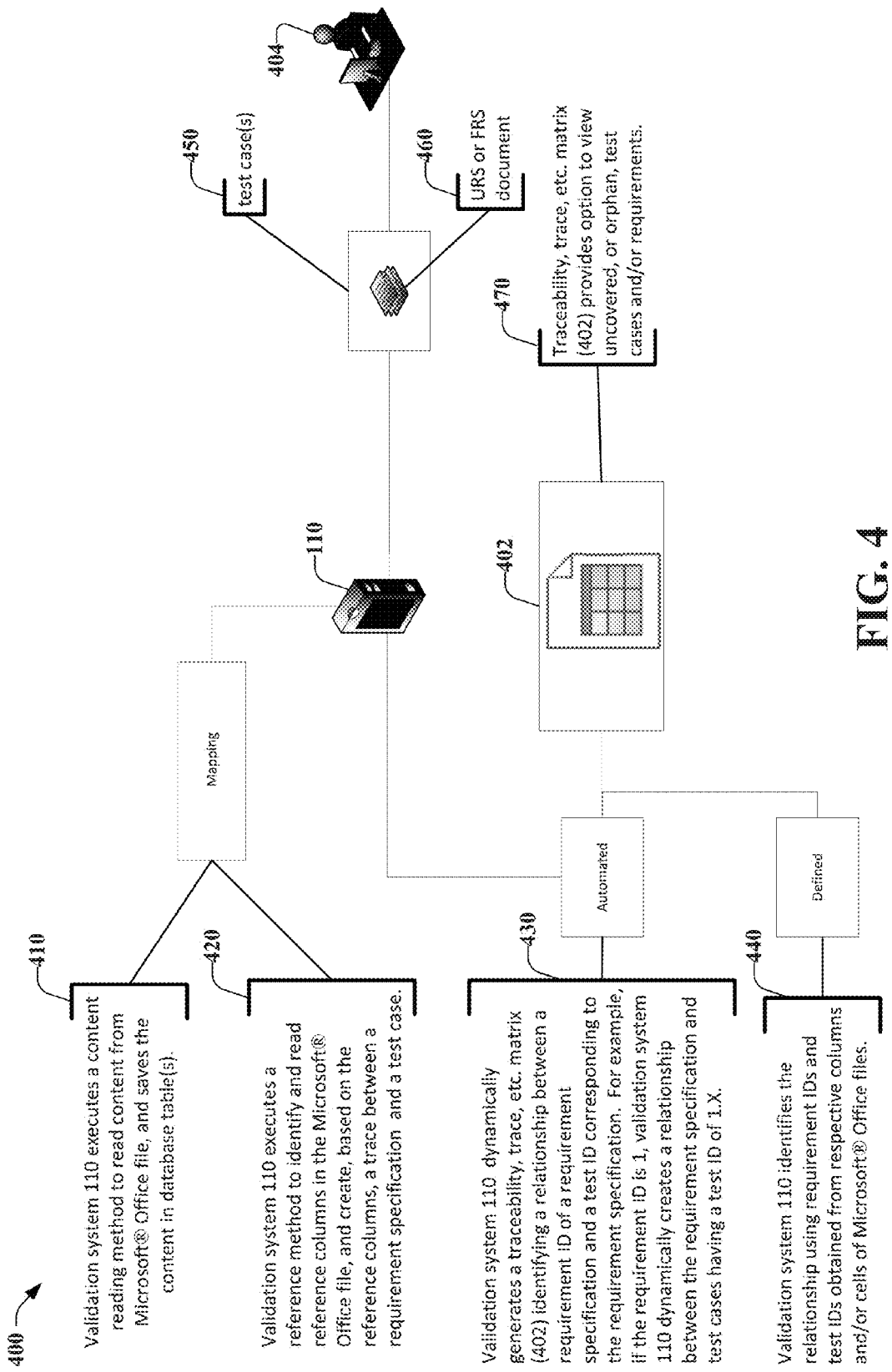
FIG. 4 illustrates a block diagram corresponding to a tracing component with respect to generation of a trace matrix, in accordance with various embodiments.

Referring now to FIG. 4, a block diagram (400) corresponding to tracing component 130 with respect to generation of the trace matrix is illustrated, in accordance with various embodiments. At 410, validation system 110 executes a content reading method to read content from a Microsoft® Office file, e.g., Microsoft® Word file, Microsoft® Excel file, etc. and saves the content in database tables (e.g. 230). At 420, validation system 110 executes a reference method to identify and read reference columns in the Microsoft® Office file, and create, based on the reference columns, a trace between a requirement specification and a test case.

At 430, validation system 110 dynamically generates a traceability matrix, trace matrix 402, etc. identifying a relationship between a requirement ID of a requirement specification and a test step ID corresponding to the requirement specification. For example, if the requirement ID is 1, validation system 110 dynamically creates a relationship between the requirement specification and test steps having a test step ID of 1.X, e.g., 1.1, 1.2, etc. At 440 validation system 110 identifies the relationship using requirement IDs and test step IDs obtained from respective columns and/or cells of Microsoft® Office files.

Validation system 110 can receive, via local system 404, data entry, selection, modification, etc. of test case 450 and URS or FRS document 460 from a user of local system 404. In this regard, validation system 110 can update relevant requirement specifications and/or test steps included in respective Microsoft® Office files. At 470, validation system 110 provides, via traceability matrix, trace matrix 402, etc., an option to the user to view uncovered, untested, orphan, etc. test steps and/or requirements.

Figure 5:
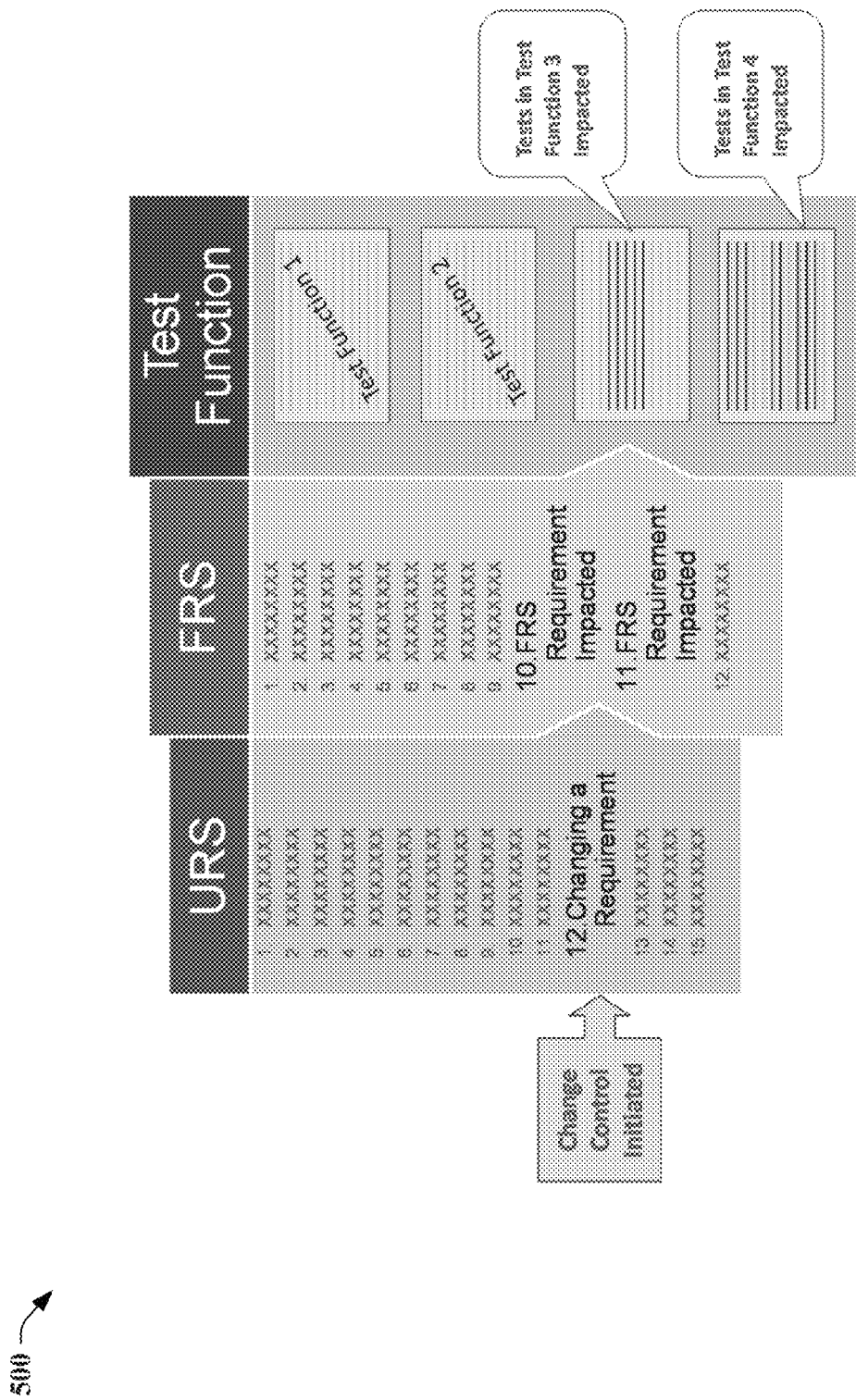
FIG. 5 illustrates a block diagram corresponding to initiation of a change request, in accordance with various embodiments.

FIG. 5 illustrates a block diagram (500) representing an initiation of a change request, in accordance with various embodiments. In this regard, in response to receiving a change request for changing a requirement of a URS, validation system 110 can determine, based on trace matrix 402, functional requirements specifications that have been impacted, affected, etc. by the change request. Further, validation system 110 can determine test steps that have been impacted, affected, etc. by the change request.

Figure 6:
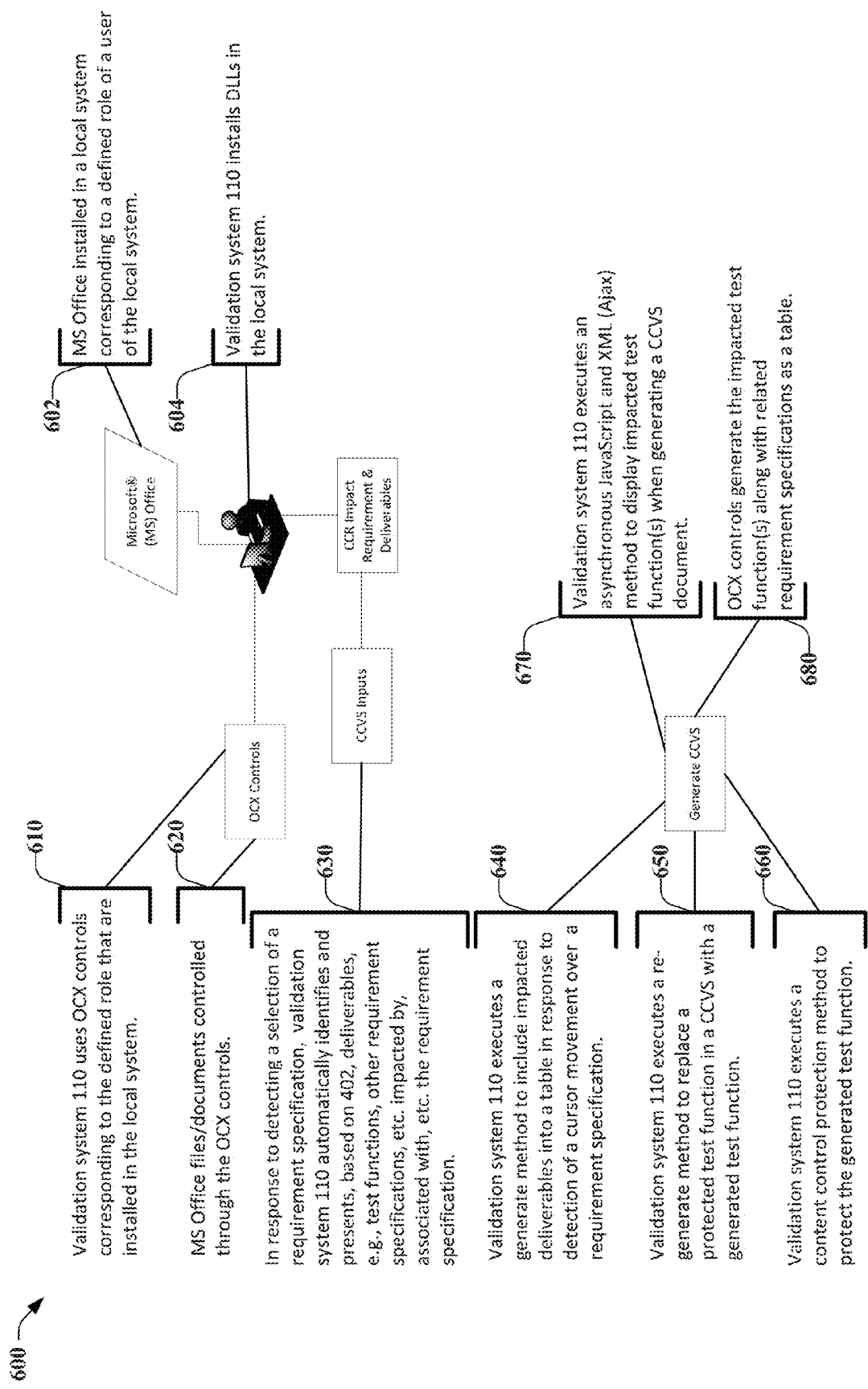
FIG. 6 illustrates a block diagram corresponding to a tracing component with respect to generation of a change control validation summary (CCVS) corresponding to initiation of a change request, in accordance with various embodiments.

Now referring to FIG. 6, a block diagram (600) corresponding to tracing component 130 with respect to generation of a CCVS, or change control document—in response to the initiation of the change request—is illustrated, in accordance with various embodiments. In this regard, tracing component 130 can automatically generate, create, etc. a summary document, e.g., the CCVS, identifying the change request for changing the requirement of the URS, the functional requirements specifications that have been impacted by the change request, and test steps that have been impacted by the change request.

For example, as illustrated by FIG. 6, at 602, Microsoft® (MS) Office has been installed in a local system corresponding to a defined role of a user of the local system. At 604, validation system 110 installs DLLs in the local system. At 610, validation system 110 controls, via the DLLs, Microsoft® Office files/documents 620 using OCX controls corresponding to a defined role of the user.

At 630, in response to detecting a selection of a requirement specification, validation system 110 automatically identifies and presents and/or displays, via the CCVS based on trace matrix 402, deliverables, e.g., test step(s), requirement specification(s), etc. that are impacted by, associated with, etc. the selected requirement specification.

At 640, validation system 110 executes a generate method to include the impacted, associated, etc. deliverables into a table in response to detection of a cursor movement over a display representing the selected requirement specification. At 650, validation system 110 executes a re-generate method to replace a protected test step, function, etc. in a CCVS with a generated test step, function, etc. At 660, validation system 110 executes a content control protection method to protect the generated test step, function, e.g., from being modified, etc.

At 670, validation system 110 executes an asynchronous JavaScript and XML (Ajax) method to display the impacted, associated, etc. deliverables, e.g., test step(s), requirement specification(s), during generation of the CCVS. At 680, the OCX controls generate the impacted, associated, etc. deliverables, e.g., test step(s), requirement specification(s), etc. as a table (not shown).

Figure 7:
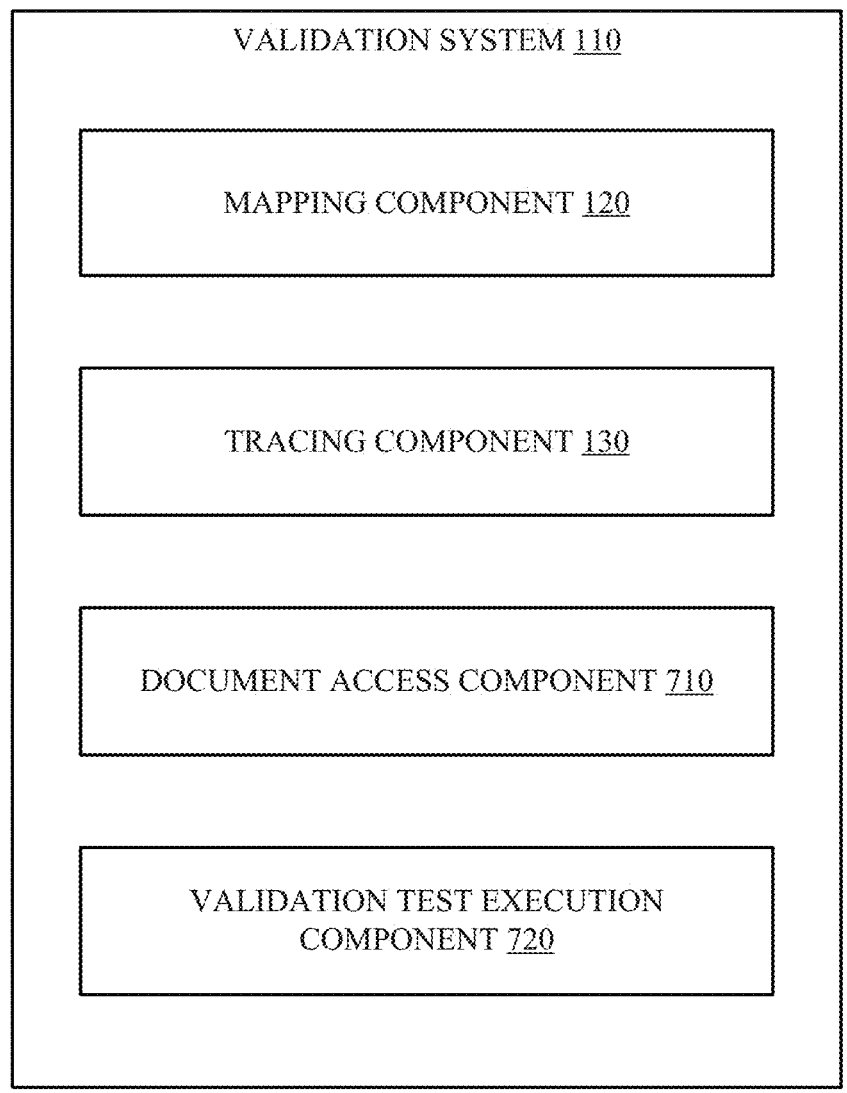
FIG. 7 illustrates a block diagram of a validation system comprising a document access component and a validation test execution component, in accordance with various embodiments.

FIG. 7 illustrates a block diagram of a validation system comprising a document access component (710) and a validation test execution component (720), in accordance with various embodiments. Document access component 710 can modify, via an OCX based on a defined validation role, e.g., an author role, reviewer role, approver role, etc., a file access permission of a requirement specification document of requirement specification documents 202, and/or of a test function document of test function documents 220.

In an embodiment, document access component 710 can modify the file access permission by controlling a DLL of an application, e.g., a Microsoft® Word file, a Microsoft® Excel file, etc. corresponding to the requirement specification document or the test function document, e.g., the DLL installed on a local machine, system, etc. of a user associated with the defined validation role.

In one embodiment, the file access permission corresponds to a track change function, e.g., track changes, etc. of the requirement specification document or the test function document. In this regard, in one embodiment, the defined validation role comprises an author role that is authorized to accept or reject a change of the track change function, and edit the requirement specification document or the test function document.

In another embodiment, the defined validation role comprises a reviewer role that is not authorized to reject the change, but is authorized to edit the requirement specification document or the test function document. In yet another embodiment, the defined validation role comprises an approver role that is authorized to reject the change, and is not authorized to edit the requirement specification document or the test function document.

Figure 8:
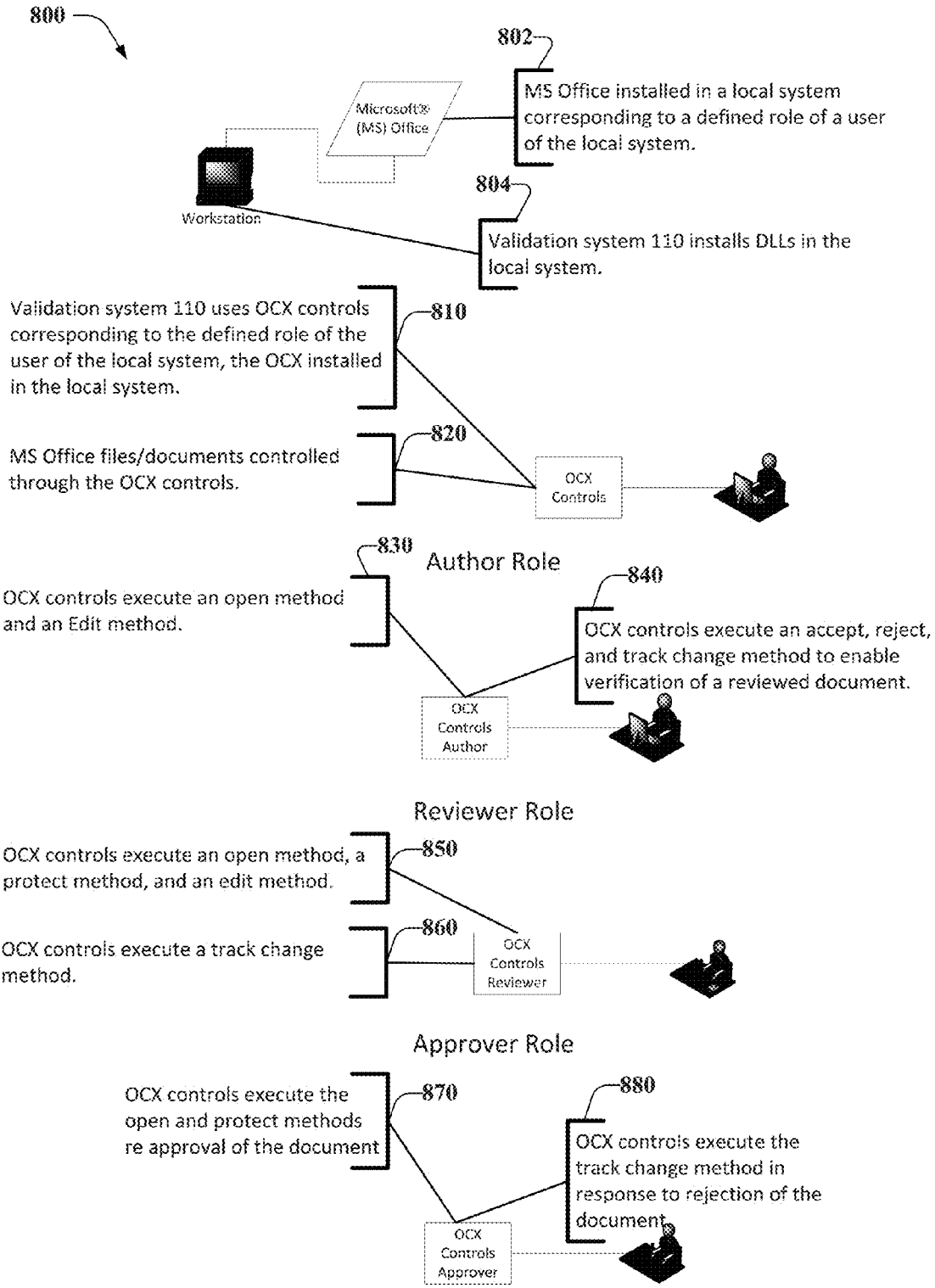
FIG. 8 illustrates a block diagram corresponding to a document access component with respect to role based access of validation documents, in accordance with various embodiments.

In this regard, FIG. 8 illustrates a block diagram (800) corresponding to document access component 710 with respect to role based access of validation documents, in accordance with various embodiments. At 802, Microsoft® (MS) Office has been installed in a local system corresponding to a defined role of a user of the local system. At 804, validation system 110 installs DLLs in the local system. At 810, validation system 110 controls, via the DLLs, Microsoft® Office files/documents 820 using OCX controls corresponding to the defined role of the user of the local system.

At 830, based on the author role being assigned to the user, the OCX controls execute an open method and an edit method to enable modification, by the user, of a reviewed document, e.g., a requirement specification document, a test function document, etc. Further, at 840, the OCX controls execute an accept, reject, and track change method to enable verification, by the user, of the reviewed document, e.g., enabling acceptance or rejection, by the user, of changes made to the document by other users.

At 850, based on the reviewer role being assigned to the user, the OCX controls execute an open method, a protect method, and an edit method to enable modification, by the user, of the reviewed document. Further, at 860, the OCX controls execute a track change method to enable tracking of edits made by the user.

At 870, based on the approver role being assigned to the user, the OCS controls execute an open method and a protect method to enable approval of the reviewed document. Further, at 880, the OCX controls execute a track change method in response to rejection of the document by the user.

Figure 9:
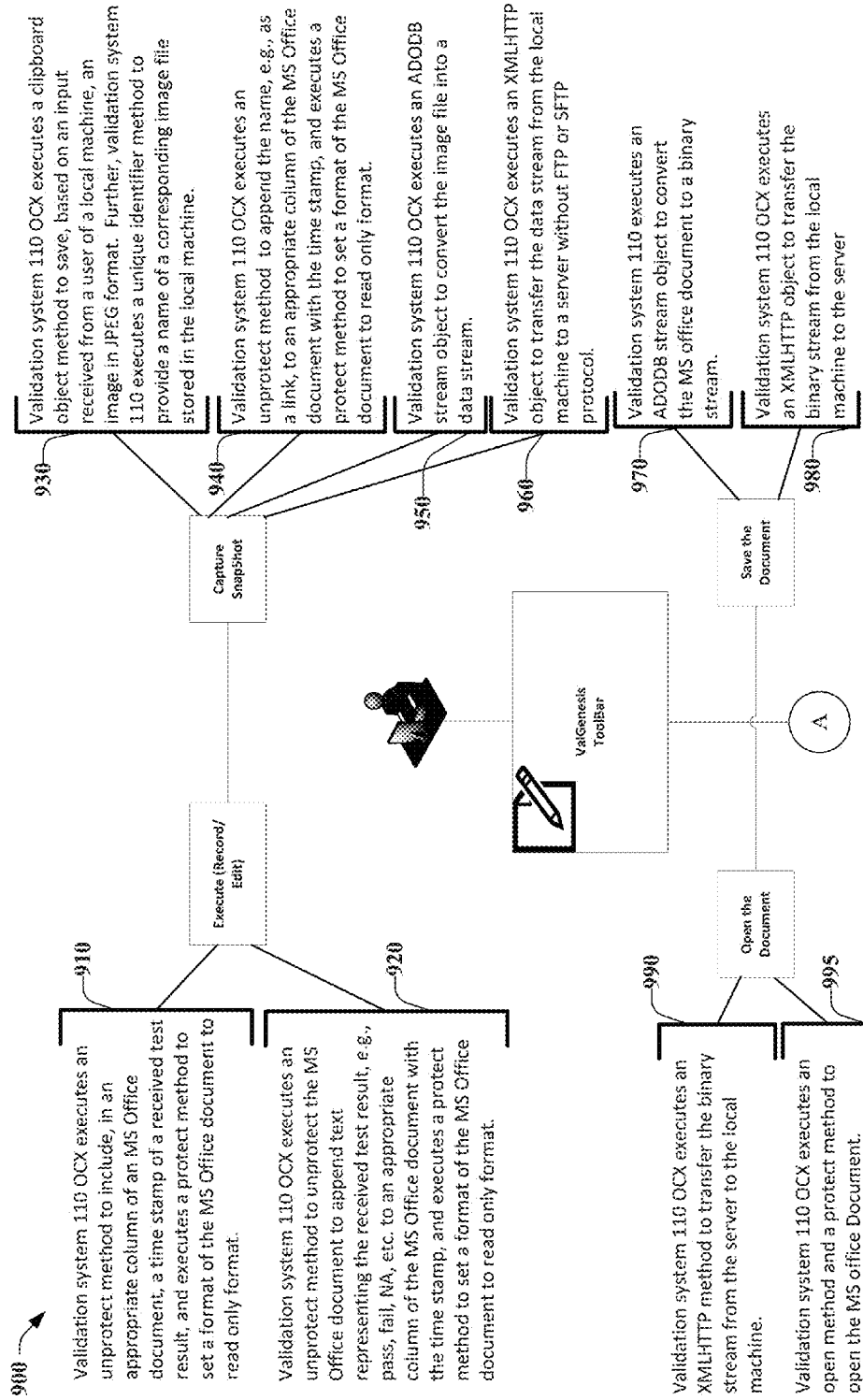
FIGS. 9-10 illustrate block diagrams corresponding to a validation test execution component with respect to electronic entry of test results of test steps, in accordance with various embodiments.
Figure 10:
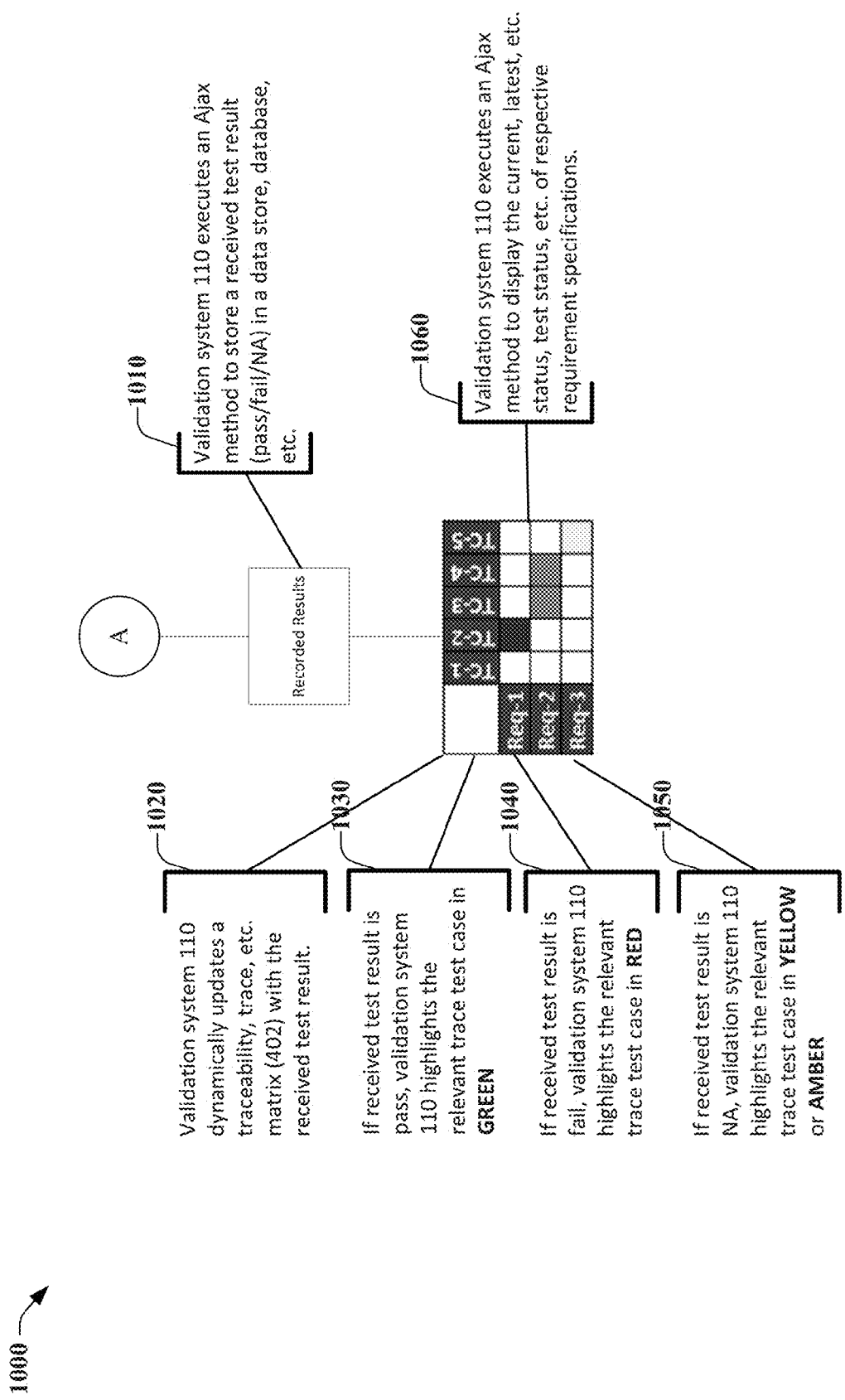

FIGS. 9-10 illustrate block diagrams corresponding to a validation test execution component (720) with respect to electronic entry of test results of test steps, in accordance with various embodiments. In this regard, validation test execution component 720 can receive, via a user interface of a local machine, system, etc. of a user, a test result, e.g., pass, fail, support, documents, etc. of a test step, test case, etc. of the test steps. Further, validation test execution component 720 can apply, associate, etc. a date and time stamp to the test result. In an embodiment, validation test execution component 720 can receive, via the user interface, a document, a file, a screen shot, etc. with respect to quantification of the test result.

In embodiment(s) illustrated by FIGS. 9 and 10, at 910, a validation system 110 OCX executes an unprotect method to include, in an appropriate column of a Microsoft® Office document, a time stamp of a received test result, and executes a protect method to set a format of the Microsoft® Office document to read only format. Further, at 920, the validation system 110 OCX executes an unprotect method to unprotect the Microsoft® Office document to append text representing the received test result, e.g., pass, fail, not-applicable (NA), etc. to an appropriate column of the Microsoft® Office document with the time stamp, and executes a protect method to set a format of the Microsoft® Office document to read only format.

At 930, a validation system 110 OCX executes a clipboard object method to save, based on an input received from a user of a local machine, an image in Joint Photographic Experts Group (JPEG) format. Further, validation system 110 OCX executes a unique identifier method to provide a name of a corresponding image file stored in the local machine.

At 940, a validation system 110 OCX executes an unprotect method to append the name, e.g., as a link, to an appropriate column of the Microsoft® Office document with the time stamp. Further, the validation system 110 OCX executes a protect method to set a format of the Microsoft® Office document to read only format.

At 950, a validation system 110 OCX executes an ActiveX data object (ADO) database (ADODB) stream object to convert the corresponding image file into a data stream. At 960, a validation system 110 OCX executes an extensive markup language (XML) hypertext transfer protocol (XMLHTTP) object to transfer the data stream from the local machine to a server, e.g., without file transfer protocol (FTP) or secure FTP (SFTP) protocol.

At 970, a validation system 110 OCX executes an ADODB stream object to convert the Microsoft® Office document to a binary stream. At 980, a validation system 110 OCX executes an XMLHTTP object to transfer the binary stream from the local machine to the server.

At 990, a validation system 110 OCX executes an XMLHTTP method to transfer the binary stream from the server to the local machine. At 995, a validation system OCX executes an open method and a protect method to open the Microsoft® Office document, e.g., for review.

At 1010, validation system 110 executes an Ajax method to store a received test result, e.g., pass, fail, NA, etc. in a data store, database, etc. At 1020, validation system 110 dynamically updates a traceability, trace, etc. matrix (402) with the received test result. At 1030, validation system 110 highlights the relevant trace test case in green if the received test result is pass. At 1040, if the received test result is fail, validation system 110 highlights the relevant tract test case in red. At 1050, if the received test result is NA, validation system 110 highlights the relevant test cast in yellow or amber. At 1060, validation system 110 executes an Ajax method to display, within the traceability, trace, etc. matrix (402), the current, latest, etc. status, test status, etc. of respective requirement specifications.

Figure 11:
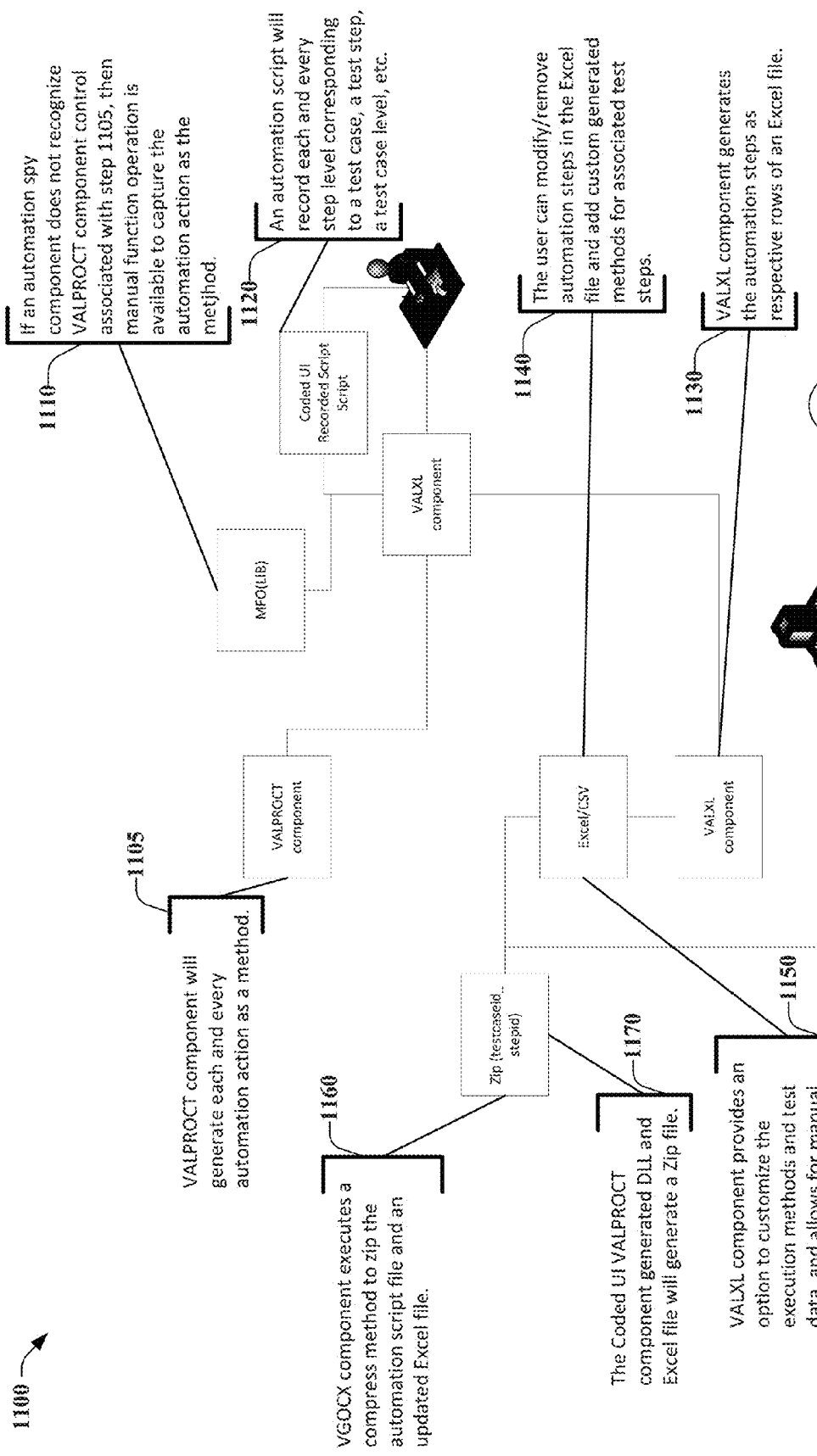
FIGS. 11-12 illustrate block diagrams corresponding to an automated validation through test automation process, in accordance with various embodiments.
Figure 12:
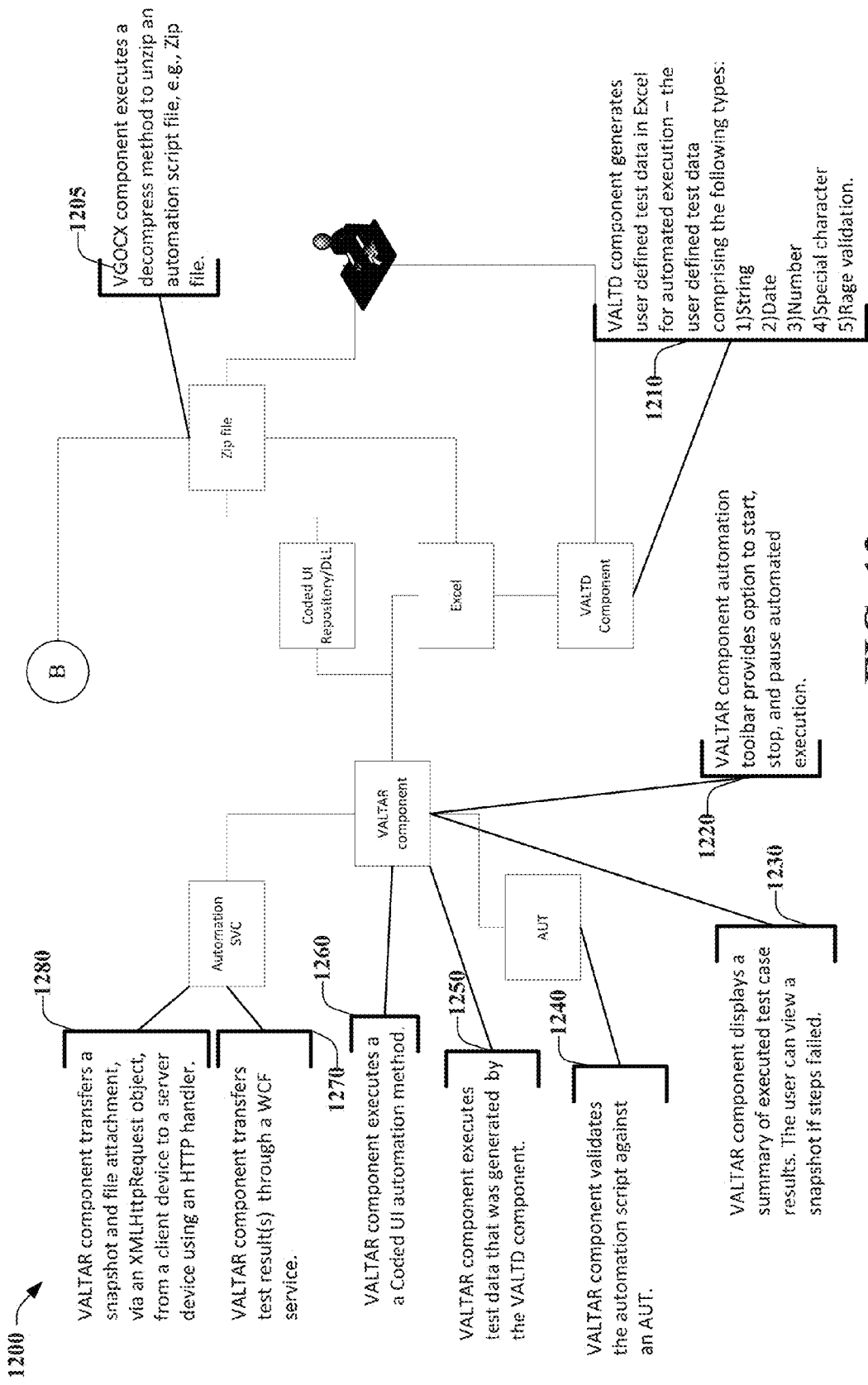

FIGS. 11-12 illustrate block diagrams (1100, 1200) corresponding to an automated Software systems validation through test automation process performed by validation system 110, in accordance with various embodiments. At 1105, a VALPROCT component will generate, during a recording process, each and every automation action as a method for performing test steps during validation of an application in execution. At 1110, if an automation spy component (not shown) does not recognize control by the VALPROCT component regarding step 1105, then a manual function operation is available to generate the method for performing the test steps.

At 1120, an automation script will record each and every step level corresponding to a test case, a test step, a test case level, etc. By default, Coded UI—e.g., corresponding to a Microsoft® UI Automation (UTA) Application Programming Interface (API) that allows access, identification, and manipulation of user interface (UI) elements of another application —will generate a .CS file (C# program file) comprising step level(s).

At 1130, a VALXL component will parse test automation actions included in the .CS file, and generate the automation steps corresponding to the test automation actions as respective rows of an Excel file. Further, the VALXL component can generate a corresponding DLL. At 1140, a user can modify/remove automation steps in the Excel file and add custom generated methods for associated test steps. Further, in addition to adding custom generated methods, at 1150, the VALXL component provides an option to customize the execution methods and test data, and allows for manual functional operation.

At 1160, a VGOCX component (not shown) executes a compress method to zip the automation script file and an updated Excel file. At 1170, the coded UI VALPROCT component generated DLL and Excel file will generate a Zip file.

At 1205, the VGOCX component executes a decompress method to unzip an automation script file, e.g., the Zip file. At 1210, a VALTD component will generate user defined test data in Excel for automated test execution—the user defined test data comprising the following data types: 1. String; 2. Date; 3. Number; 4. Special character; and 5. Rage validation.

At 1220, a VALTAR component automation toolbar will provide the option to start, stop, and pause an automated execution. At 1230, the VALTAR component will display a summary of executed test case results. Further, the user can view a snapshot if steps failed.

At 1240, the VALTAR component validates the automation script against an Application Under Testing (AUT). At 1250, the VALTAR component executes test data that was generated by the VALTD component. At 1260, the VALTAR component executes a Coded UI automation method. At 1270, the VALTAR component transfers test result(s) through a Windows Communication Foundation (WCF) service. At 1280, the VALTAR component transfers a snapshot and file attachment, via a Java based XMLHttpRequest object, from a client device to a server device using an Hypertext Transfer Protocol (HTTP) handler. In this regard, such process(es) leverage test and validation automation with documented evidence for executed results.

Figure 13:
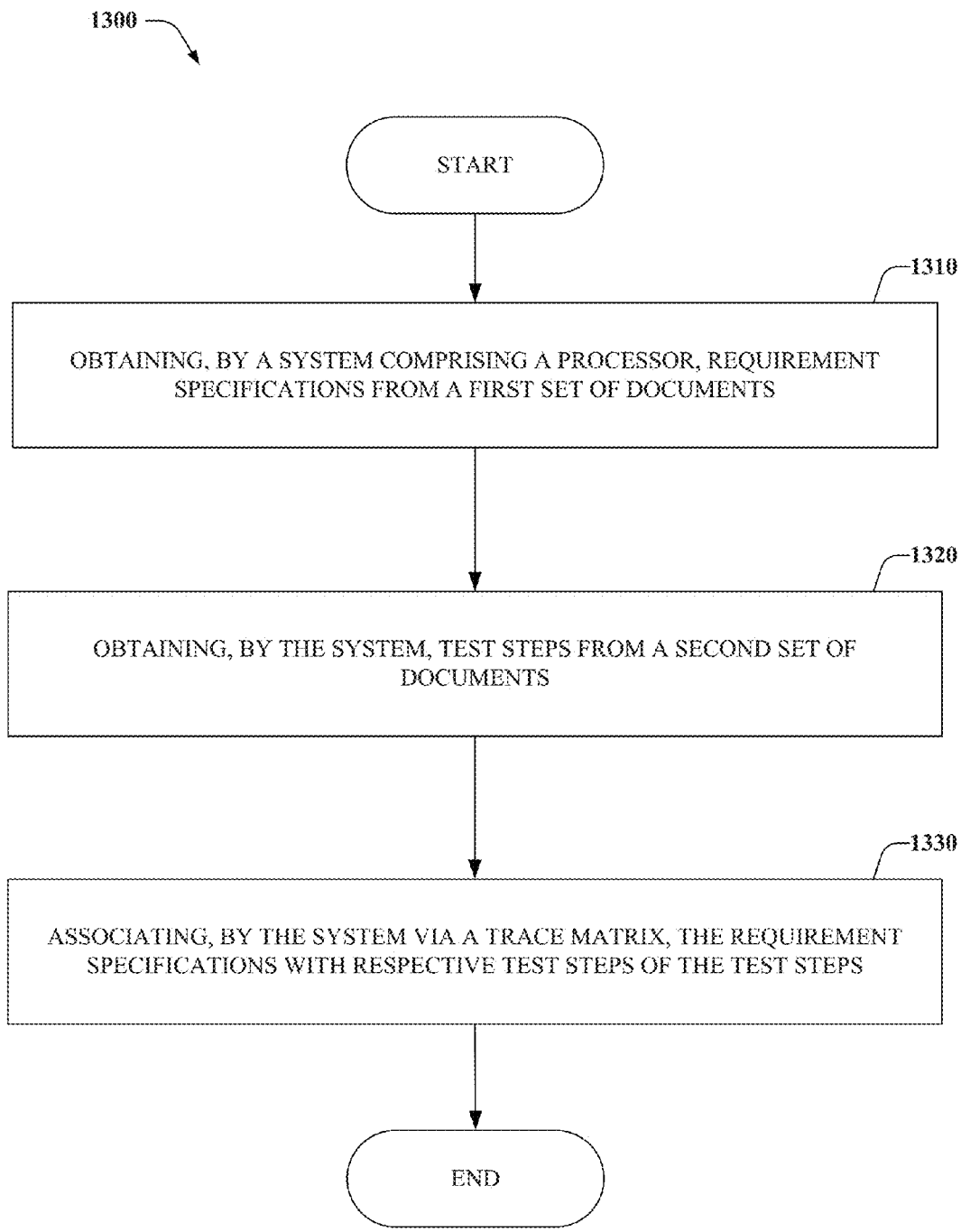
FIGS. 13-15 illustrate flowcharts of a method/method(s) associated with a system for validating and maintaining respective validated status of software applications and manufacturing systems and processes, in accordance with various embodiments.
Figure 14:
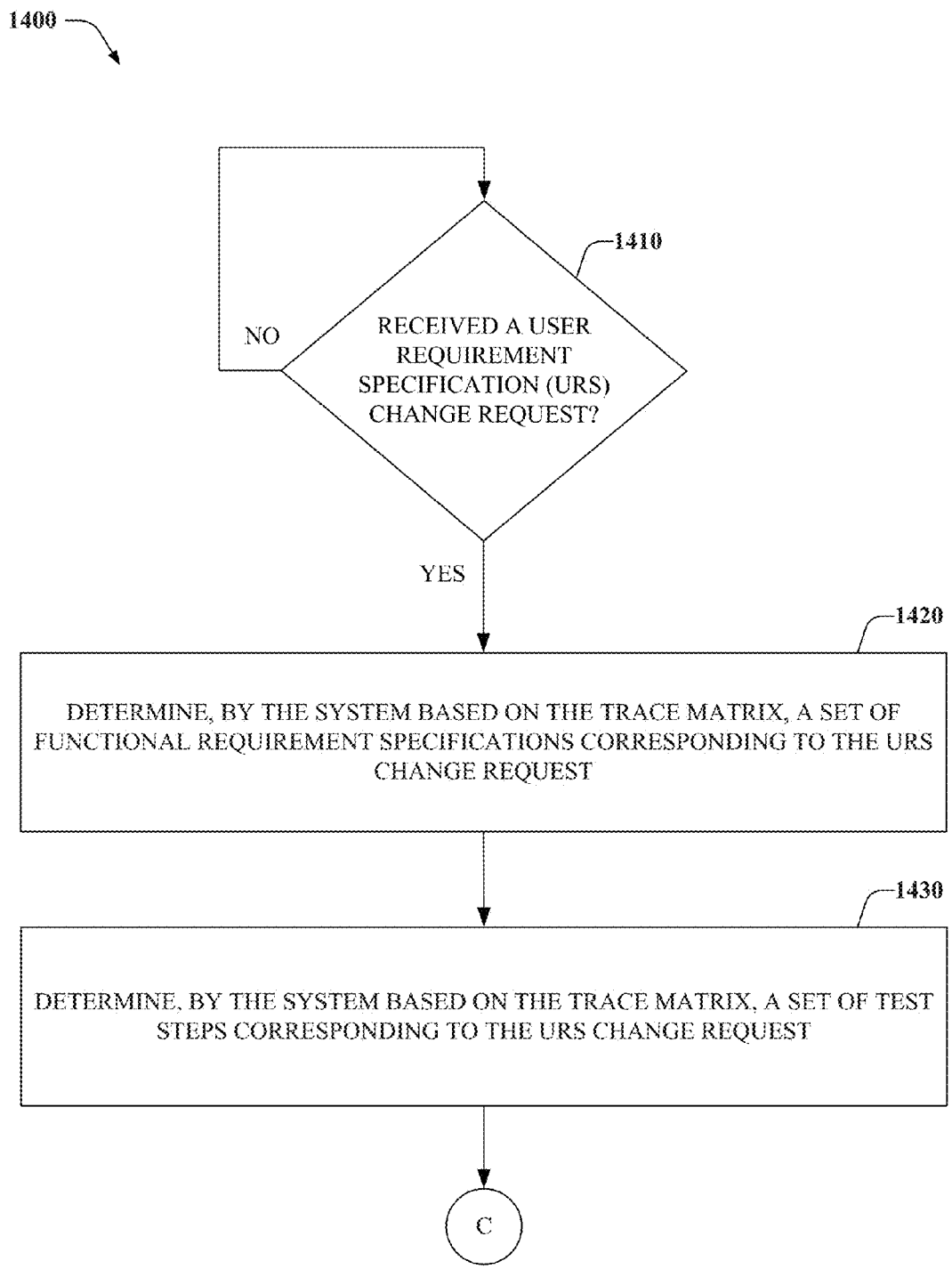
Figure 15:
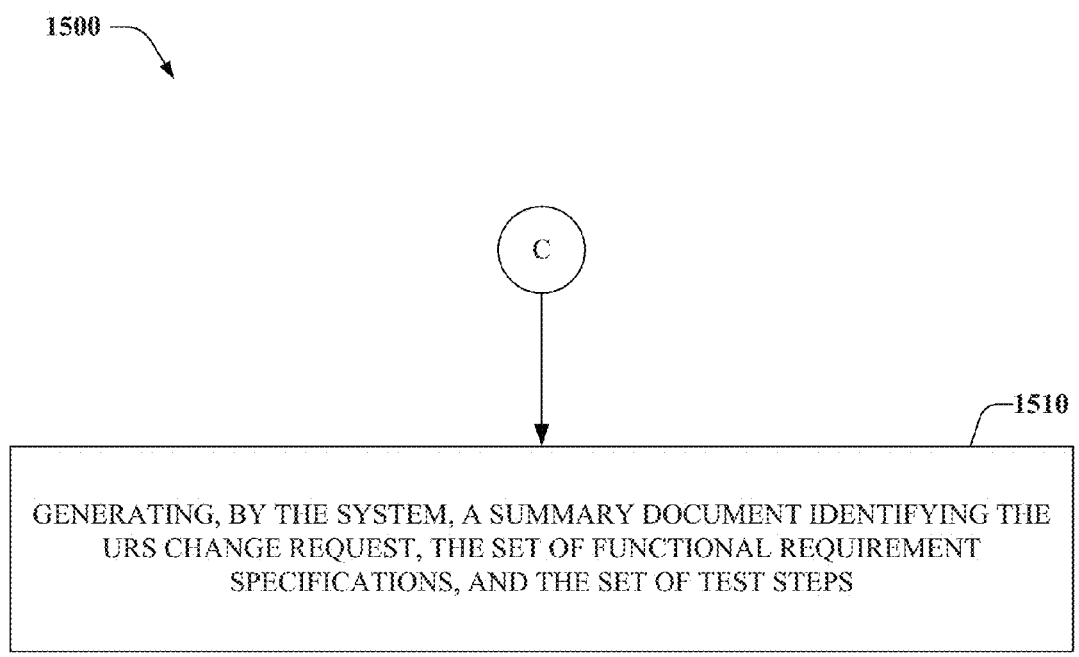

FIGS. 13-15 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 13, process 1300 performed by a system comprising a processor, e.g., validation system 110, is illustrated, in accordance with various embodiments. At 1310, requirement specifications, e.g., a URS, an FRS, etc. can be obtained, retrieved, extracted, etc. from a first set of documents, e.g., Microsoft® Office documents.

At 1320, test steps can be obtained, retrieved, extracted, etc. from a second set of documents, e.g., Microsoft® Office documents. At 1330, the requirement specifications and be associated with respective test steps of the test steps utilizing the trace matrix.

FIGS. 14-15 illustrate other processes performed by the system, in accordance with various embodiments. At 1410, it can be determined whether a URS change request has been received. In this regard, if it has been determined that the URS change request has been received, flow continues to 1420, at which a set of functional requirement specifications corresponding to the URS change request can be determined based on the trace matrix; otherwise flow returns to 1410.

Flow continues from 1420 to 1430, at which a set of test steps corresponding to the URS change request can be determined based on the trace matrix. Flow continues from 1430 to 1510, at which a summary document, e.g., CCVS, identifying the URS change request, the set of functional requirement specifications, and the set of test steps can be generated.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in database tables 230, non-volatile memory 1622 (see below), disk storage 1624 (see below), and/or memory storage 1646 (see below). Further, nonvolatile memory can be included in read only memory (ROM), programmable ROM (PROM), electrically programmable ROM (EPROM), electrically erasable ROM (EEPROM), or flash memory. Volatile memory 1220 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 16:
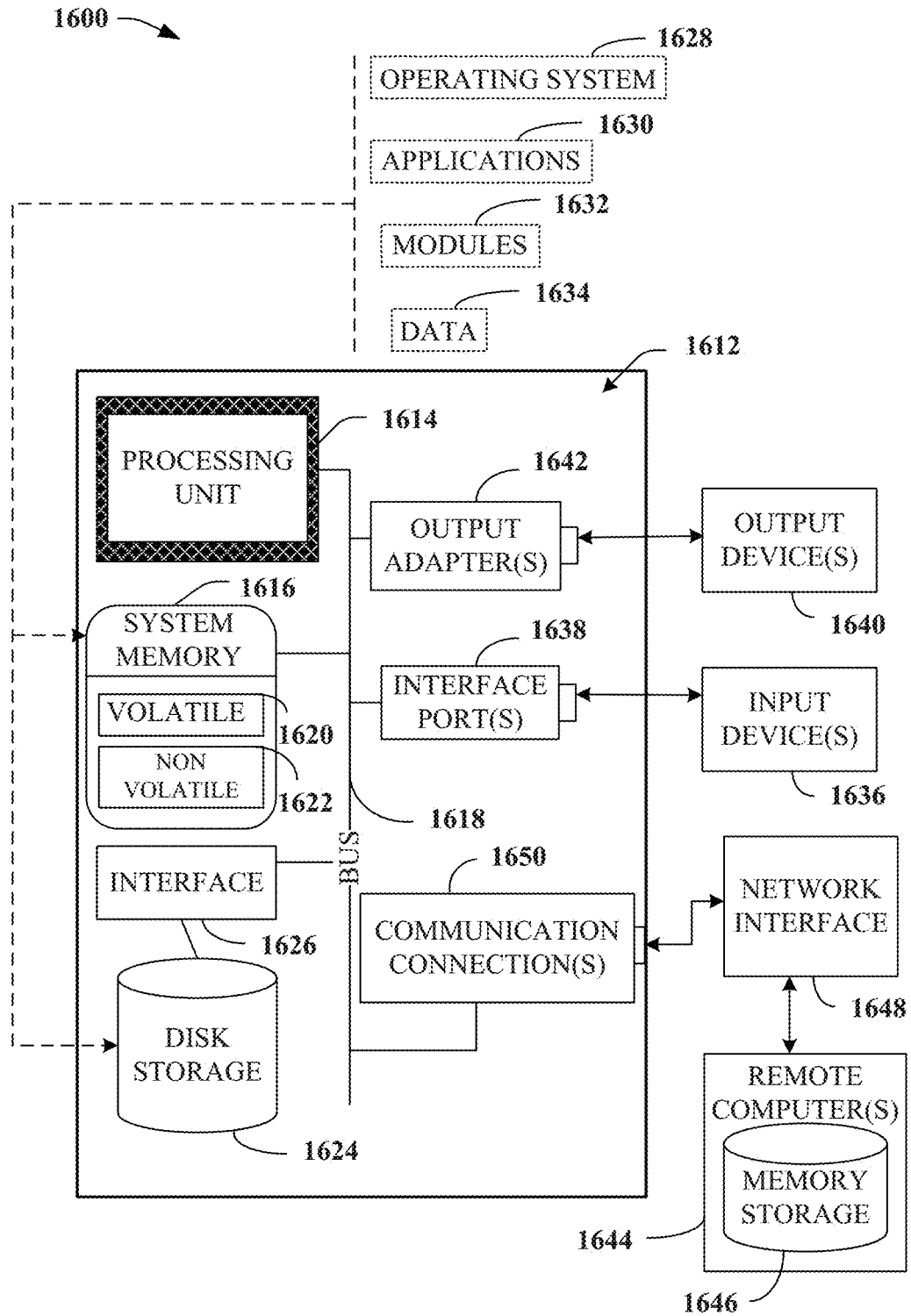
FIG. 16 is a block diagram representing an illustrative non-limiting computing system or operating environment in which one or more aspects of various embodiments described herein can be implemented.

In order to provide a context for the various aspects of the disclosed subject matter, FIG. 16, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 16, a block diagram of a computing system 1600 operable to execute the disclosed systems and methods is illustrated, in accordance with an embodiment. Computer 1612 comprises a processing unit 1614, a system memory 1616, and a system bus 1618. System bus 1618 couples system components comprising, but not limited to, system memory 1616 to processing unit 1614. Processing unit 1614 can be any of various available processors. Dual microprocessors and other multiprocessor architectures also can be employed as processing unit 1614.

System bus 1618 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1616 comprises volatile memory 1620 and nonvolatile memory 1622. A basic input/output system (BIOS), containing routines to transfer information between elements within computer 1612, such as during start-up, can be stored in nonvolatile memory 1622. By way of illustration, and not limitation, nonvolatile memory 1622 can comprise ROM, PROM, EPROM, EEPROM, or flash memory. Volatile memory 1620 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1612 also comprises removable/non-removable, volatile/non-volatile computer storage media. FIG. 16 illustrates, for example, disk storage 1624. Disk storage 1624 comprises, but is not limited to, devices like a magnetic disk drive, floppy disk drive, tape drive, Jaz drive, Zip drive, LS-100 drive, flash memory card, or memory stick. In addition, disk storage 1624 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to system bus 1618, a removable or non-removable interface is typically used, such as interface 1626.

It is to be appreciated that FIG. 16 describes software that acts as an intermediary between users and computer resources described in suitable operating environment 1600. Such software comprises an operating system 1628. Operating system 1628, which can be stored on disk storage 1624, acts to control and allocate resources of computer system 1612. System applications 1630 take advantage of the management of resources by operating system 1628 through program modules 1632 and program data 1634 stored either in system memory 1616 or on disk storage 1624. It is to be appreciated that the disclosed subject matter can be implemented with various operating systems or combinations of operating systems.

A user can enter commands or information into computer 1612 through input device(s) 1636. Input devices 1636 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1614 through system bus 1618 via interface port(s) 1638. Interface port(s) 1638 comprise, for example, a serial port, a parallel port, a game port, a universal serial bus (USB), a wireless based port, e.g., Wi-Fi, Bluetooth, etc. Output device(s) 1640 use some of the same type of ports as input device(s) 1636.

Thus, for example, a USB port can be used to provide input to computer 1612 and to output information from computer 1612 to an output device 1640. Output adapter 1642 is provided to illustrate that there are some output devices 1640, like display devices, light projection devices, monitors, speakers, and printers, among other output devices 1640, which use special adapters. Output adapters 1642 comprise, by way of illustration and not limitation, video and sound devices, cards, etc. that provide means of connection between output device 1640 and system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. Remote computer(s) 1644 can be a personal computer, a server, a router, a network PC, a workstation, a microprocessor based appliance, a peer device, or other common network node and the like, and typically comprises many or all of the elements described relative to computer 1612.

For purposes of brevity, only a memory storage device 1646 is illustrated with remote computer(s) 1644. Remote computer(s) 1644 is logically connected to computer 1612 through a network interface 1648 and then physically and/or wirelessly connected via communication connection 1650. Network interface 1648 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1650 refer(s) to hardware/software employed to connect network interface 1648 to bus 1618. While communication connection 1650 is shown for illustrative clarity inside computer 1612, it can also be external to computer 1612. The hardware/software for connection to network interface 1648 can comprise, for example, internal and external technologies such as modems, comprising regular telephone grade modems, cable modems and DSL modems, wireless modems, ISDN adapters, and Ethernet cards.

The computer 1612 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1612 can connect to other devices/networks by way of antenna, port, network interface adaptor, wireless access point, modem, and/or the like.

The computer 1612 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
in response to reading requirement data elements representing respective individual requirement specifications from first rows of requirement specification documents, and in response to reading test step data elements representing respective test steps from second rows of test function documents, generating a trace matrix comprising a representation of a relationship between a requirement data element of the requirement data elements corresponding to a first row of the first rows of the requirement specification documents and a test step data element of the test step data elements corresponding to a second row of the second rows of the test function documents, wherein the representation comprises a test step identifier (ID) representing the test step data element, and wherein the test step ID comprises an individual requirement specification ID representing the requirement data element; and
in response to receiving a user requirement specification (URS) change request for a URS of the individual requirement specifications, determining, based on the trace matrix using the individual requirement specification ID representing the requirement data element corresponding to the first row of the first rows of the requirement specification documents, a set of impacted functional requirement specifications of the individual requirement specifications that have been impacted by the URS change request.

2. The system of claim 1, wherein the first rows comprise rows of a data table of a Microsoft® Word file or a cell of a Microsoft® Excel file.

3. The system of claim 1, wherein the second rows comprise rows of a data table of a Microsoft® Word file or a cell of a Microsoft® Excel file.

4. The system of claim 1, wherein the operations further comprise:
in response to the determining of the set of impacted functional requirement specifications, determining, based on the trace matrix using test identifications comprising the test step ID, a set of impacted test steps of the respective test steps corresponding to the URS change request.

5. The system of claim 4, wherein the operations further comprise:
in response to receiving the URS change request, automatically generating a change control validation summary (CCVS) document identifying the URS change request, the set of impacted functional requirement specifications, and the set of impacted test steps.

6. The system of claim 1, wherein the operations further comprise:
preventing a modification of a test function document of the test function documents by a user, wherein the test function document represents a test result of a test step of the respective test steps;
receiving, via a user interface of a device corresponding to the user, the test result;
associating a date and time stamp to the test result; and
populating the test result, text representing a name of the user, and the date and time stamp in a test result cell of the test function document.

7. The system of claim 1, wherein the operations further comprise:
modifying, based on a defined validation role via an object linking and embedding (OLE) control extension (OCX), a file access permission of a requirement specification document of the requirement specification documents.

8. The system of claim 7, wherein the modifying of the file access permission comprises:
controlling a dynamic link library (DLL) of an application corresponding to the requirement specification document.

9. The system of claim 8, wherein the application comprises at least one of Microsoft® Word or Microsoft® Excel.

10. The system of claim 7, wherein the file access permission corresponds to a track change function of the requirement specification document.

11. The system of claim 10, wherein the operations further comprise:
enforcing, via respective OCX controls, respective roles of authors, reviewers, and approvers of the set of requirement specification documents.

12. The system of claim 1, wherein the operations further comprise:
modifying, based on a defined validation role via an object linking and embedding (OLE) control extension (OCX), a file access permission of a test function document of the test function documents.

13. A method, comprising:
in response to reading requirement specifications represented by requirement specification data objects from first cells of first documents, and in response to reading test functions represented by test function data objects from second cells of second documents, creating, by a system comprising a processor, a trace matrix representing a relationship between a requirement specification of the requirement specifications corresponding to a first cell of the first cells of the first documents and a test function of the test functions corresponding to a second cell of the second cells of the second documents, wherein a test function identification (ID) representing the test function comprises a requirement specification ID representing the requirement specification; and
in response to receiving a request to change the requirement specification corresponding to the first cell of the first cells of the first documents, determining, based on the trace matrix using the requirement specification ID, affected requirement specifications of the requirement specifications that have been affected by the request.

14. The method of claim 13, wherein the first cells comprise a row of a data table of a Microsoft® Word file or a cell of a Microsoft® Excel file.

15. The method of claim 13, wherein the second cells comprise a row of a data table of a Microsoft® Word file or a cell of a Microsoft® Excel file.

16. The method of claim 13, further comprising:
preventing, by the system, a modification, by a user identity, of a test function document of the second documents representing a test result of a test function of the test functions.

17. A non-transitory machine-readable storage medium, comprising executable instructions that, when executed by a processor, facilitate performance of operations, comprising:
in response to acquiring requirement specifications as requirement specification data elements from respective first cells of a first document, and in response to acquiring test steps as test step data elements from respective second cells of a second document, creating a trace matrix comprising a test step identifier (ID) representing a test step data element of the test step data elements corresponding to a test step cell of the respective second cells of the second document, wherein the test step ID comprises a requirement specification ID representing a requirement specification data element of the requirement specification data elements corresponding to a requirement specification cell of the respective first cells of the first document; and
based on a request to modify a requirement specification of the requirement specifications corresponding to the requirement specification data element corresponding to the requirement specification cell of the first document, determining, using the trace matrix based on the requirement specification ID, impacted requirement specifications of the requirement specifications that have been impacted by the request.

18. The non-transitory machine-readable storage medium of claim 17, wherein the operations further comprise:
preventing a modification, by a user, of a test function document representing a test result of a test step of the test steps.

19. The non-transitory machine-readable storage medium of claim 18, wherein the operations further comprise:
receiving, via a user interface of a device corresponding to the user, the test result;
associating a date and time stamp to the test result; and
populating the test result, text representing a name of the user, and the date and time stamp in a test result cell of the test function document.

20. The non-transitory machine-readable storage medium of claim 17, wherein the operations further comprise:
recording, using a coded user interface (UI) application, test actions corresponding to the test step data elements in a program file, the test actions corresponding to validation of an application in execution according to the requirement specification data elements;
generating, based on the program file, automation steps corresponding to the test actions as respective rows of a Microsoft® Excel file; and
automatically validating, using the Microsoft® Excel file, the application in execution and recording test results in a test result document.

* * * * *